(12) United States Patent
Son

(10) Patent No.: US 10,678,026 B2
(45) Date of Patent: Jun. 9, 2020

(54) OPTICAL SYSTEM

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/140,768

(22) Filed: Sep. 25, 2018

(65) Prior Publication Data
US 2019/0025554 A1 Jan. 24, 2019

Related U.S. Application Data

(62) Division of application No. 14/643,253, filed on Mar. 10, 2015, now Pat. No. 10,114,195.

(30) Foreign Application Priority Data

Oct. 16, 2014 (KR) ........................ 10-2014-0139756

(51) Int. Cl.
*G02B 9/64* (2006.01)
*G02B 13/00* (2006.01)
*G02B 13/04* (2006.01)

(52) U.S. Cl.
CPC .......... *G02B 13/0045* (2013.01); *G02B 9/64* (2013.01); *G02B 13/04* (2013.01)

(58) Field of Classification Search
CPC . G02B 9/00; G02B 9/64; G02B 13/00; G02B 13/001; G02B 13/0015; G02B 13/002; G02B 13/0045

See application file for complete search history.

(56) References Cited

U.S. PATENT DOCUMENTS

| 5,754,345 A | 5/1998 | Yamamoto |
| 7,199,947 B2 | 4/2007 | Wang et al. |
| 8,736,979 B2 | 5/2014 | Tsai et al. |
| 10,114,195 B2 * | 10/2018 | Son ................... G02B 13/0045 |

(Continued)

FOREIGN PATENT DOCUMENTS

| CN | 2612961 Y | 4/2004 |
| CN | 202886713 U | 4/2013 |

(Continued)

OTHER PUBLICATIONS

Chinese Office Action dated Feb. 8, 2018 in corresponding Chinese Patent Application No. 2015101657040 (13 pages in English and 9 pages in Chinese).

(Continued)

*Primary Examiner* — Thong Q Nguyen
(74) *Attorney, Agent, or Firm* — NSIP Law

(57) ABSTRACT

An optical system includes a first lens having negative refractive power and having two concave surfaces, a second lens having positive refractive power, a third lens having refractive power, a fourth lens having refractive power, a fifth lens having refractive power, a sixth lens having refractive power, and a seventh lens having refractive power. The first to seventh lenses are sequentially disposed from an object side. Whereby an aberration improvement effect may be increased and high resolution and a wide angle may be implemented.

24 Claims, 15 Drawing Sheets

(56) References Cited

U.S. PATENT DOCUMENTS

| | | | |
|---|---|---|---|
| 2006/0007561 A1* | 1/2006 | Suzuki | G02B 9/58 |
| | | | 359/749 |
| 2007/0115558 A1 | 5/2007 | Ito | |
| 2009/0225444 A1 | 9/2009 | Yamamoto | |
| 2010/0091381 A1 | 4/2010 | Katakura | |
| 2012/0212836 A1 | 8/2012 | Hsieh et al. | |
| 2012/0229692 A1 | 9/2012 | Matsumura | |
| 2012/0300113 A1 | 11/2012 | Okubo | |
| 2013/0010372 A1 | 1/2013 | Chou | |
| 2014/0043694 A1 | 2/2014 | Tsai et al. | |
| 2014/0139931 A1 | 5/2014 | Kubota | |
| 2015/0226936 A1* | 8/2015 | Suzuki | G02B 13/04 |
| | | | 359/708 |
| 2016/0085055 A1* | 3/2016 | Asami | G02B 9/64 |
| | | | 359/755 |
| 2017/0293107 A1* | 10/2017 | Wang | G02B 9/64 |

FOREIGN PATENT DOCUMENTS

| | | |
|---|---|---|
| JP | 9-90214 A | 4/1997 |
| JP | 2013-160981 A | 8/2013 |
| JP | 2014-102291 A | 6/2014 |
| TW | 201407187 A | 2/2014 |

OTHER PUBLICATIONS

Korean Office Action dated Jan. 1, 2016 in counterpart Korean Application No. 10-2014-0139756 (6 pages in Korean with English translation).

* cited by examiner

| FIRST EXEMPLARY EMBODIMENT 1 | RADIUS OF CURVATURE | THICKNESS OR DISTANCE | REFRACTIVE INDEX | ABBE'S NUMBER | EFFECTIVE RADIUS | f |
|---|---|---|---|---|---|---|
| S1 | -2.1312 | 0.2502 | 1.644 | 54 | 1.596 | -1.384 |
| S2 | 1.6121 | 0.1000 | | | 1.245 | |
| S3 | 1.9605 | 0.8174 | 1.597 | 51.3 | 1.234 | 2.654 |
| S4 | -7.1206 | 0.1883 | | | 1.202 | |
| S5 | 1.2718 | 0.3952 | 1.658 | 21.5 | 0.857 | 5.608 |
| S6 | 1.7013 | 0.3804 | | | 0.640 | |
| S7 | 1.5582 | 0.4256 | 1.546 | 56.1 | 0.520 | 1.633 |
| S8 | -1.8822 | 0.0501 | | | 0.493 | |
| Stop | Infinity | 0.1682 | | | 0.440 | |
| S10 | -1.0319 | 0.2549 | 1.643 | 23.4 | 0.451 | -1.372 |
| S11 | 6.6634 | 0.0763 | | | 0.565 | |
| S12 | 2.1726 | 0.7499 | 1.546 | 56.1 | 0.680 | 0.987 |
| S13 | -0.6293 | 0.0501 | | | 0.787 | |
| S14 | 1.0718 | 0.2502 | 1.546 | 56.1 | 0.867 | -1.883 |
| S15 | 0.4815 | 0.2523 | | | 1.054 | |
| S16 | | 0.3000 | 1.516 | 64.1 | 1.081 | |
| S17 | | 0.3019 | | | 1.174 | |
| Image | | 0.0016 | | | 1.347 | |

FIG. 4

| Surface# | S1 | S2 | S3 | S4 | S5 |
|---|---|---|---|---|---|
| Conic constant (K) | -1.1026608E+01 | -7.7391690E-02 | 1.1520006E-01 | 1.0633997E+01 | 9.5625460E-01 |
| 4th Order Coefficient(A) | 1.6886503E-02 | -8.7715008E-03 | 6.4794150E-03 | 1.4564089E-04 | -1.5492316E-01 |
| 6th Order Coefficient(B) | -5.6765745E-03 | 3.4247860E-03 | -2.8414744E-03 | -2.0509286E-02 | -4.8270994E-02 |
| 8th Order Coefficient(C) | 2.2921930E-04 | 3.1863744E-03 | -5.4222636E-04 | 5.4076206E-03 | 2.1810586E-02 |
| 10th Order Coefficient(D) | 1.0180283E-04 | -1.0484261E-03 | -8.2726303E-04 | 8.1912185E-05 | -8.2325091E-02 |
| 12th Order Coefficient(E) | | 3.6706656E-04 | 5.5530153E-05 | | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S6 | S7 | S8 | S10 | S11 |
|---|---|---|---|---|---|
| Conic constant (K) | 5.7244239E+00 | 4.1919376E+00 | 4.3506676E+00 | 5.4250299E-01 | -2.6381682E+01 |
| 4th Order Coefficient(A) | -6.8739731E-03 | -5.5601737E-03 | -2.4256248E-02 | -3.6762347E-02 | -1.8010763E-02 |
| 6th Order Coefficient(B) | 2.2589003E-03 | 7.1438459E-02 | 4.8939417E-02 | 5.1013837E-01 | 1.1257931E-01 |
| 8th Order Coefficient(C) | 2.8646259E-03 | -3.2877372E-01 | 1.1569491E-01 | 4.5228992E+00 | 9.4365120E-02 |
| 10th Order Coefficient(D) | 3.0340588E-02 | 6.8472786E-01 | 4.6132776E+01 | -2.3313136E+01 | |
| 12th Order Coefficient(E) | | -5.3415430E-01 | 3.2007044E+00 | 3.9652773E+01 | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S12 | S13 | S14 | S15 | |
|---|---|---|---|---|---|
| Conic constant (K) | 6.3058733E+00 | -2.8163480E+00 | -1.2537340E+01 | -3.8716419E+00 | |
| 4th Order Coefficient(A) | -9.0532197E-02 | -1.5232718E-01 | -4.3468551E-01 | -4.9544615E-01 | |
| 6th Order Coefficient(B) | -3.7133962E-01 | -7.9690654E-03 | -3.6584330E-01 | 4.5828876E-01 | |
| 8th Order Coefficient(C) | -6.9419958E-01 | 1.1965775E+00 | 8.5291731E-01 | 1.2063457E+00 | |
| 10th Order Coefficient(D) | 8.1167568E-01 | 6.2479653E+00 | -2.1890663E+00 | 3.8970978E+00 | |
| 12th Order Coefficient(E) | -2.4639283E+01 | -1.5351157E+01 | 4.9483369E+00 | -7.8763094E+00 | |
| 14th Order Coefficient(F) | 3.5127567E+01 | 2.1580508E+01 | -4.2727521E+01 | 9.9845900E+00 | |
| 16th Order Coefficient(G) | -2.0915660E+01 | -1.4274531E+01 | 9.5766091E-01 | -7.6608561E-01 | |
| 18th Order Coefficient(H) | | 1.469395913 | | 3.237576327 | |
| 20th Order Coefficient(J) | | 1.956593626 | | -0.583342307 | |

FIG. 5

| FIRST EXEMPLARY EMBODIMENT 2 | RADIUS OF CURVATURE | THICKNESS OR DISTANCE | REFRACTIVE INDEX | ABBE'S NUMBER | EFFECTIVE RADIUS | f |
|---|---|---|---|---|---|---|
| S1 | -1.9110 | 0.2500 | 1.716 | 47.2 | 1.663 | -1.374 |
| S2 | 2.1579 | 0.0600 | | | 1.265 | |
| S3 | 2.0610 | 0.7093 | 1.732 | 28.5 | 1.250 | 2.478 |
| S4 | -12.9299 | 0.0600 | | | 1.196 | |
| S5 | 1.6456 | 0.2903 | 1.755 | 27.5 | 0.893 | 16.329 |
| S6 | 1.7550 | 0.3463 | | | 0.668 | |
| S7 | 1.6923 | 0.4918 | 1.546 | 56.1 | 0.580 | 1.786 |
| S8 | -2.0640 | 0.0600 | | | 0.545 | |
| Stop | Infinity | 0.2242 | | | 0.500 | |
| S10 | -0.7890 | 0.2500 | 1.643 | 23.4 | 0.499 | -1.782 |
| S11 | -2.8507 | 0.0600 | | | 0.586 | |
| S12 | 1.9760 | 0.6391 | 1.546 | 56.1 | 0.680 | 1.172 |
| S13 | -0.8384 | 0.0600 | | | 0.764 | |
| S14 | 0.9166 | 0.2500 | 1.546 | 56.1 | 0.855 | -3.920 |
| S15 | 0.5800 | 0.2490 | | | 0.991 | |
| S16 | | 0.3000 | 1.516 | 64.1 | 1.022 | |
| S17 | | 0.5025 | | | 1.102 | |
| Image | | -0.0025 | | | 1.318 | |

FIG. 9

| Surface# | S1 | S2 | S3 | S4 | S5 |
|---|---|---|---|---|---|
| Conic constant (K) | -1.2191950E+01 | -7.8189171E-01 | 1.7822509E-01 | -5.8321281E-01 | 4.1442052E-01 |
| 4th Order Coefficient(A) | 2.2600742E-02 | -5.3860643E-02 | 2.3845000E-02 | 4.6040252E-03 | -2.7837044E-01 |
| 6th Order Coefficient(B) | -3.5980391E-03 | 1.8912898E-02 | -2.1317459E-02 | -2.3063425E-02 | 6.1328827E-02 |
| 8th Order Coefficient(C) | 9.8136938E-04 | 3.1925077E-03 | -8.0331877E-03 | 3.5571500E-03 | 8.0227351E-02 |
| 10th Order Coefficient(D) | -7.3919301E-05 | -2.1079927E-03 | -3.1223120E-04 | -1.2573704E-03 | -3.0489390E-02 |
| 12th Order Coefficient(E) | | 1.7288584E-03 | -1.6477407E-03 | | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S6 | S7 | S8 | S10 | S11 |
|---|---|---|---|---|---|
| Conic constant (K) | 4.5609008E+00 | 4.7417170E+00 | 2.3785245E+00 | 3.2830702E-01 | 1.3386923E+01 |
| 4th Order Coefficient(A) | 1.4718809E-01 | 3.2833793E-01 | 2.7907974E-02 | 1.9905078E-02 | -1.2271813E-01 |
| 6th Order Coefficient(B) | 2.6100891E-01 | 1.2295901E-02 | 1.3310625E-01 | 2.2373266E-01 | 2.6656185E-01 |
| 8th Order Coefficient(C) | 1.3166681E-01 | -5.8739340E-01 | -6.4057278E-01 | 2.1105140E-01 | 1.1755218E+00 |
| 10th Order Coefficient(D) | -5.4221450E-01 | 3.2989671E-01 | 2.4189410E+00 | -1.0431197E+00 | |
| 12th Order Coefficient(E) | | -2.7401175E-02 | -6.0551818E-03 | 3.1512496E-03 | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S12 | S13 | S14 | S15 |
|---|---|---|---|---|
| Conic constant (K) | 5.0786733E+00 | -3.2869557E+00 | -3.5952469E+00 | -3.1418584E+00 |
| 4th Order Coefficient(A) | -1.4691460E-01 | -1.6287230E-01 | -5.4430234E-02 | -4.9552539E-01 |
| 6th Order Coefficient(B) | -4.0686252E-01 | -1.1636997E-01 | -1.4508948E-01 | 1.6979802E-01 |
| 8th Order Coefficient(C) | 7.5794695E-01 | -2.7446033E-02 | 5.2731382E-02 | 5.2067894E-02 |
| 10th Order Coefficient(D) | 1.1046517E-03 | 3.3652966E-01 | 4.9411869E-01 | -2.1495437E-02 |
| 12th Order Coefficient(E) | -1.0000001E+00 | 1.0000019E+00 | 1.4104897E-01 | 5.6426392E-02 |
| 14th Order Coefficient(F) | -1.0889493E-02 | 9.7371540E-04 | -1.1483244E-01 | -1.3655694E-02 |
| 16th Order Coefficient(G) | 3.3844701E-03 | -6.8025989E-02 | -4.6385586E-01 | -6.0931518E-02 |
| 18th Order Coefficient(H) | | 0.100000003 | | 0.021270414 |
| 20th Order Coefficient(J) | | 0.000867075 | | -1.14E-07 |

FIG. 10

| FIRST EXEMPLARY EMBODIMENT 3 | RADIUS OF CURVATURE | THICKNESS OR DISTANCE | REFRACTIVE INDEX | ABBE'S NUMBER | EFFECTIVE RADIUS | f |
|---|---|---|---|---|---|---|
| S1 | -1.8207 | 0.2500 | 1.706 | 48.1 | 1.754 | -1.372 |
| S2 | 2.2106 | 0.0600 | | | 1.320 | |
| S3 | 2.0882 | 0.6893 | 1.755 | 27.5 | 1.290 | 2.620 |
| S4 | -37.0074 | 0.0653 | | | 1.248 | |
| S5 | 1.5213 | 0.2924 | 1.755 | 27.5 | 0.908 | 14.249 |
| S6 | 1.6230 | 0.3740 | | | 0.657 | |
| S7 | 1.9079 | 0.4909 | 1.546 | 56.1 | 0.580 | 1.728 |
| S8 | -1.6966 | 0.0600 | | | 0.553 | |
| Stop | Infinity | 0.2187 | | | 0.500 | |
| S10 | -0.7995 | 0.2500 | 1.643 | 23.4 | 0.501 | -1.768 |
| S11 | -3.0265 | 0.0600 | | | 0.589 | |
| S12 | 1.9230 | 0.6387 | 1.546 | 56.1 | 0.680 | 1.191 |
| S13 | -0.8676 | 0.0600 | | | 0.772 | |
| S14 | 0.8813 | 0.2500 | 1.546 | 56.1 | 0.863 | -4.892 |
| S15 | 0.5963 | 0.2408 | | | 1.004 | |
| S16 | | 0.3000 | 1.516 | 64.1 | 1.040 | |
| S17 | | 0.5016 | | | 1.120 | |
| Image | | -0.0016 | | | 1.341 | |

FIG. 14

| Surface# | S1 | S2 | S3 | S4 | S5 |
|---|---|---|---|---|---|
| Conic constant (K) | -1.1706759E+01 | -1.5509191E+00 | 2.0051816E-01 | -2.0000000E+01 | 1.9085188E-01 |
| 4th Order Coefficient(A) | 2.0032527E-02 | -6.1898760E-02 | 2.9218181E-02 | 7.4487630E-03 | -3.0493409E-01 |
| 6th Order Coefficient(B) | -3.5054519E-03 | 1.8534211E-02 | -2.4492445E-02 | -2.6530577E-02 | 6.7366259E-02 |
| 8th Order Coefficient(C) | 9.9757321E-04 | 2.3160149E-03 | -8.2233441E-03 | 1.3344250E-03 | 9.1480041E-02 |
| 10th Order Coefficient(D) | -6.3149869E-05 | -2.1809339E-03 | -5.1867290E-05 | -2.1594279E-04 | -3.1320988E-02 |
| 12th Order Coefficient(E) | | 1.6918076E-03 | -1.6017866E-03 | | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S6 | S7 | S8 | S10 | S11 |
|---|---|---|---|---|---|
| Conic constant (K) | 4.2349762E+00 | 6.0446447E+00 | 1.2829771E+00 | 5.7168506E-01 | 1.6384505E+01 |
| 4th Order Coefficient(A) | 1.3949719E-01 | 3.2354117E-01 | 6.4511552E-02 | 2.8859116E-01 | -1.9506372E-01 |
| 6th Order Coefficient(B) | 3.3743884E-01 | 2.1898710E-02 | -6.6459976E-02 | 1.6768657E-01 | 2.2237263E-01 |
| 8th Order Coefficient(C) | 1.4236727E-01 | -6.0195398E-01 | -2.1563336E-01 | 1.7445930E+00 | 1.4897413E+00 |
| 10th Order Coefficient(D) | -3.6738526E-01 | 1.9475867E-01 | 1.4823133E+00 | 3.5101528E+00 | |
| 12th Order Coefficient(E) | | 7.8044252E-02 | -6.0551818E-03 | 3.1512496E-03 | |
| 14th Order Coefficient(F) | | | | | |
| 16th Order Coefficient(G) | | | | | |
| 18th Order Coefficient(H) | | | | | |
| 20th Order Coefficient(J) | | | | | |

| Surface# | S12 | S13 | S14 | S15 | |
|---|---|---|---|---|---|
| Conic constant (K) | 4.8487651E+00 | -3.0848602E+00 | -2.6556223E+00 | -2.8732993E+00 | |
| 4th Order Coefficient(A) | -2.1512199E-01 | -1.0497208E-02 | -6.1608696E-01 | -5.4523012E-01 | |
| 6th Order Coefficient(B) | -3.5408408E-01 | -1.4004716E-01 | -1.3700846E-01 | 1.6103265E-01 | |
| 8th Order Coefficient(C) | 6.9037050E-01 | -7.4614288E-02 | 3.4698754E-02 | 1.0264959E-01 | |
| 10th Order Coefficient(D) | -9.5206892E-03 | 2.8622228E-01 | 5.2080501E-01 | -4.2880525E-02 | |
| 12th Order Coefficient(E) | 1.0000001E+00 | 1.0002317E-01 | 1.4103419E-01 | 5.6457659E-02 | |
| 14th Order Coefficient(F) | 6.4019689E-03 | 9.7371540E-04 | -1.1483244E-01 | -1.3617483E-02 | |
| 16th Order Coefficient(G) | -8.1656140E-02 | -6.7990481E-02 | -4.6385586E-01 | -6.0905311E-02 | |
| 18th Order Coefficient(H) | | 0.099315366 | | 0.021288034 | |
| 20th Order Coefficient(J) | | 0.000867075 | | -1.14E-07 | |

FIG. 15

OPTICAL SYSTEM

CROSS-REFERENCE TO RELATED APPLICATIONS

This application is a division of U.S. patent application Ser. No. 14/643,253 filed on Mar. 10, 2015, now U.S. Pat. No. 10,114,195 issued on Oct. 30, 2018, which claims the benefit under 35 USC 119(a) of Korean Patent Application No. 10-2014-0139756 filed on Oct. 16, 2014, in the Korean Intellectual Property Office, the entire disclosures of which are incorporated herein by reference for all purposes.

BACKGROUND

The present disclosure relates to an optical system.

Recently, mobile communications terminals have been provided with camera modules, so that video calls, as well as the capturing of still and moving images, are possible. In addition, as the functionality of cameras included in mobile communications terminals has gradually increased, cameras for mobile communications terminals have come to be required to have high levels of resolution and high degrees of performance.

However, in accordance with the trend for the gradual miniaturization and lightening of mobile communications terminals, there are limitations in implementing cameras having levels of resolution and high degrees of performance.

In order to solve such problems, recently, the lenses included in camera modules have been formed of plastic, a material lighter than glass, and a lens module has been configured using five or more lenses in order to implement a high level of resolution therein.

SUMMARY

An aspect of the present disclosure may provide an optical system capable of improving an aberration improvement effect and implementing high resolution.

According to an aspect of the present disclosure, an optical system may include: a first lens having negative refractive power and having two concave surfaces; a second lens having positive refractive power; a third lens having refractive power; a fourth lens having refractive power; a fifth lens having refractive power; a sixth lens having refractive power; and a seventh lens having refractive power, wherein the first to seventh lenses are sequentially disposed from an object side, whereby an aberration improvement effect may be increased and high resolution and a wide angle may be implemented.

BRIEF DESCRIPTION OF DRAWINGS

The above and other aspects, features and other advantages of the present disclosure will be more clearly understood from the following detailed description taken in conjunction with the accompanying drawings, in which:

FIG. 4 is a table showing characteristics of each lens of the optical system shown in FIG. 1;

FIG. 5 is a table showing aspherical surface coefficients of each lens of the optical system shown in FIG. 1;

FIG. 9 is a table showing characteristics of each lens of the optical system shown in FIG. 6;

FIG. 10 is a table showing aspherical surface coefficients of each lens of the optical system shown in FIG. 6;

FIG. 14 is a table showing characteristics of each lens of the optical system shown in FIG. 11; and FIG. 15 is a table showing aspherical surface coefficients of each lens of the optical system shown in FIG. 11.

DETAILED DESCRIPTION

Figure 1:
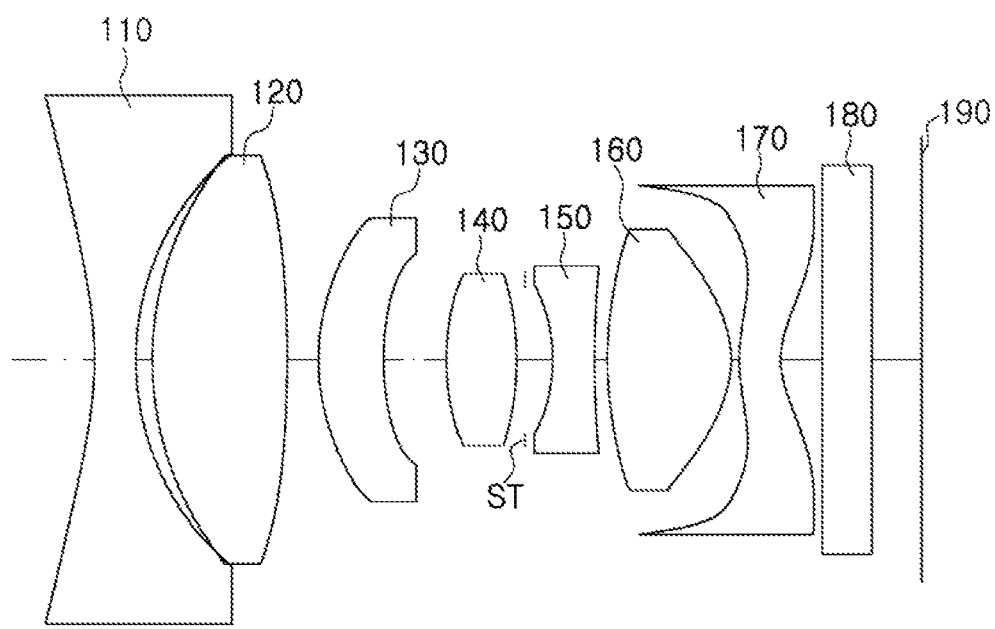
FIG. 1 is a configuration diagram of an optical system according to a first exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the following lens configuration diagrams, thicknesses, sizes, and shapes of lenses have been slightly exaggerated for explanation. Particularly, a shape of a spherical surface or an aspherical surface shown in the lens configuration diagrams has been shown only by way of example. That is, the spherical surface or the aspherical surface is not limited to having the shown shape.

In addition, it is to be noted that a first lens refers to a lens that is the closest to an object side, and a seventh lens refers to a lens that is the closest to an image side.

Further, it is to be noted that the term 'front' refers to a direction from the optical system toward the object side, while the term 'rear' refers to a direction from the optical system toward an image sensor or the image side. Further, it is to be noted that a first surface of each lens refers to a surface close to the object side (or an object-side surface) and a second surface of each lens refers to a surface close to the image side (or an image-side surface). Further, in the present specification, it is to be noted that units of all of numerical values of radii of curvature, thicknesses, and the like, of lenses are mm.

An optical system according to an exemplary embodiment of the present disclosure may include seven lenses.

That is, the optical system according to an exemplary embodiment of the present disclosure may include a first lens, a second lens, a third lens, a fourth lens, a fifth lens, a sixth lens, and a seventh lens.

However, the optical system according to an exemplary embodiment of the present disclosure is not limited to including only the seven lenses, but may further include other components, if necessary. For example, the optical system may further include a stop controlling an amount of light. In addition, the optical system may further include an infrared cut-off filter cutting off an infrared ray. Further, the optical system may further include an image sensor converting an image of a subject incident thereto into an electrical signal. Further, the optical system may further include a gap maintaining member adjusting a gap between lenses.

The first to seventh lenses configuring the optical system according to an exemplary embodiment of the present disclosure may be formed of glass or plastic.

For example, the fourth to seventh lenses may be formed of the plastic, and the first to third lenses may be formed of the glass or the plastic.

In addition, at least one of the first to seventh lenses may have an aspherical surface. Further, each of the first to seventh lenses may have at least one aspherical surface.

That is, at least one of first and second surfaces of the first to seventh lenses may be aspherical. Here, the aspherical surfaces of the first to seventh lenses may be represented by Mathematical Expression 1.

$$Z = \frac{cY^2}{1+\sqrt{1-(1+K)c^2Y^2}} + AY^4 + BY^6 + CY^8 + DY^{10} + EY^{12} + FY^{14} + \ldots$$ [Mathematical Expression 1]

Here, c is a curvature (an inverse value of a radius of curvature) at an apex of the lens, K is a conic constant, and Y is a distance in a direction perpendicular to an optical axis. In addition, constants A to F mean aspherical surface coefficients. In addition, Z indicates a distance from the apex of the lens in an optical axis direction.

The optical system including the first to seventh lenses may have negative refractive power/positive refractive power/positive refractive power/positive refractive power/negative refractive power/positive refractive power/positive or negative refractive power sequentially from the object side.

The optical system configured as described above may improve optical performance through aberration improvement.

The optical system according to an exemplary embodiment of the present disclosure may satisfy Conditional Expression 1.

$$ANG \geq 90°$$ [Conditional Expression 1]

Here, ANG is a field of view of the optical system.

The optical system according to an exemplary embodiment of the present disclosure may satisfy Conditional Expression 2.

$$53° < ANG/Fno < 61°$$ [Conditional Expression 2]

Here, ANG is the field of view of the optical system, and Fno is a constant indicating brightness of the optical system.

The optical system according to an exemplary embodiment of the present disclosure may satisfy Conditional Expression 3.

$$Fno \leq 1.7$$ [Conditional Expression 3]

Here, Fno is the constant indicating the brightness of the optical system.

The optical system according to an exemplary embodiment of the present disclosure may satisfy Conditional Expression 4.

$$Fno \leq 1.6$$ [Conditional Expression 4]

Here, Fno is the constant indicating the brightness of the optical system.

The optical system according to an exemplary embodiment of the present disclosure may satisfy Conditional Expression 5.

$$1.6 < ImgH/EPD < 1.8$$ [Conditional Expression 5]

Here, ImgH is one-half of a diagonal length of an imaging surface of the image sensor, and EPD is an entrance pupil diameter of the optical system. Here, an entrance pupil means an image by a lens positioned in front of the stop.

The optical system according to an exemplary embodiment of the present disclosure may satisfy Conditional Expression 6.

$$3.7 < TTL/EFL < 4.0$$ [Conditional Expression 6]

Here, TTL is a distance from an object-side surface of the first lens to the imaging surface of the image sensor, and EFL is an overall focal length of the optical system.

The optical system according to an exemplary embodiment of the present disclosure may satisfy Conditional Expression 7.

$$17° < ANG/TTL < 20°$$ [Conditional Expression 7]

Here, ANG is the field of view of the optical system, and TTL is the distance from the object-side surface of the first lens to the imaging surface of the image sensor.

The optical system according to an exemplary embodiment of the present disclosure may satisfy Conditional Expression 8.

$$3.5 < TTL/ImgH < 3.8$$ [Conditional Expression 8]

Here, TTL is the distance from the object-side surface of the first lens to the imaging surface of the image sensor, and ImgH is one-half the diagonal length of the imaging surface of the image sensor.

The optical system according to an exemplary embodiment of the present disclosure may satisfy Conditional Expression 9.

$$0.4 < SL/TTL < 0.55$$ [Conditional Expression 9]

Here, SL is a distance from the stop to the imaging surface of the image sensor, and TTL is the distance from the object-side surface of the first lens to the imaging surface of the image sensor.

Next, the first to seventh lenses configuring the optical system according to an exemplary embodiment of the present disclosure will be described.

The first lens may have negative refractive power. In addition, both surfaces of the first lens may be concave. In detail, a first surface of the first lens may be concave toward an object, and a second surface thereof may be concave toward an image.

At least one of the first and second surfaces of the first lens may be aspherical. For example, both surfaces of the first lens may be aspherical.

The second lens may have positive refractive power. In addition, both surfaces of the second lens may be convex.

At least one of first and second surfaces of the second lens may be aspherical. For example, both surfaces of the second lens may be aspherical.

The third lens may have positive refractive power. In addition, the third lens may have a meniscus shape in which it is convex toward the object. In detail, first and second surfaces of the third lens may be convex toward the object.

At least one of the first and second surfaces of the third lens may be aspherical. For example, both surfaces of the third lens may be aspherical.

The fourth lens may have positive refractive power. In addition, both surfaces of the fourth lens may be convex.

At least one of first and second surfaces of the fourth lens may be aspherical. For example, both surfaces of the fourth lens may be aspherical.

The fifth lens may have negative refractive power. In addition, both surfaces of the fifth lens may be concave. In detail, a first surface of the fifth lens may be concave toward the object, and a second surface thereof may be concave toward the image.

In addition, the fifth lens may have a meniscus shape in which it is convex toward the image. In detail, the first and second surfaces of the fifth lens may be convex toward the image.

At least one of the first and second surfaces of the fifth lens may be aspherical. For example, both surfaces of the fifth lens may be aspherical.

The sixth lens may have positive refractive power. In addition, both surfaces of the sixth lens may be convex.

At least one of first and second surfaces of the sixth lens may be aspherical. For example, both surfaces of the sixth lens may be aspherical.

The seventh lens may have negative refractive power. In addition, the seventh lens may have a meniscus shape in which it is convex toward the object. In detail, first and second surfaces of the seventh lens may be convex toward the object.

In addition, the seventh lens may have an inflection point formed on at least any one of the first and second surfaces thereof. For example, the second surface of the seventh lens may be concave in a paraxial region and become convex toward an edge thereof.

In addition, at least one of the first and second surfaces of the seventh lens may be aspherical. For example, both surfaces of the seventh lens may be aspherical.

In the optical system configured as described above, a plurality of lenses perform an aberration correction function, whereby aberration improvement performance may be improved. In addition, in the optical system, the first lens may have the negative refractive power to implement a wide field of view, and the second lens may have the positive refractive power to smoothly correct spherical aberration.

In addition, the third lens may have the positive refractive power to further smoothly correct spherical aberration and coma aberration.

An optical system according to a first exemplary embodiment of the present disclosure will be described with reference to FIGS. 1 through 5.

The optical system according to a first exemplary embodiment of the present disclosure may include a first lens 110, a second lens 120, a third lens 130, a fourth lens 140, a fifth lens 150, a sixth lens 160, and a seventh lens 170, and may further include a stop ST, an infrared cut-off filter 180, and an image sensor 190.

Here, lens characteristics (radii of curvature, thicknesses of lenses or distances between the lenses, refractive indices, and Abbe's numbers) of each lens are shown in FIG. 4.

In a first exemplary embodiment of the present disclosure, the first lens 110 may have negative refractive power and have two concave surfaces. The second lens 120 may have positive refractive power and have both surfaces that are convex. The third lens 130 may have positive refractive power and have a meniscus shape in which it is convex toward the object. The fourth lens 140 may have positive refractive power and have both surfaces that are convex. The fifth lens 150 may have negative refractive power and have two concave surfaces. The sixth lens 160 may have positive refractive power and have both surfaces that are convex. The seventh lens 170 may have negative refractive power and have a meniscus shape in which it is convex toward the object. In addition, the seventh lens 170 may have an inflection point formed on at least one of first and second surfaces thereof.

Meanwhile, the respective surfaces of the first to seventh lenses 110 to 170 may have aspherical surface coefficients as shown in FIG. 5. That is, all of the first surface of the first lens 110 to the second surface of the seventh lens 170 may be aspherical.

In addition, the stop ST may be disposed between the fourth lens 140 and the fifth lens 150.

In addition, the first lens 110 among the first to seventh lenses 110 to 170 may have the largest effective radius, and the second lens 120 among the first to seventh lenses 110 to 170 may have the second largest effective radius.

Figure 2:
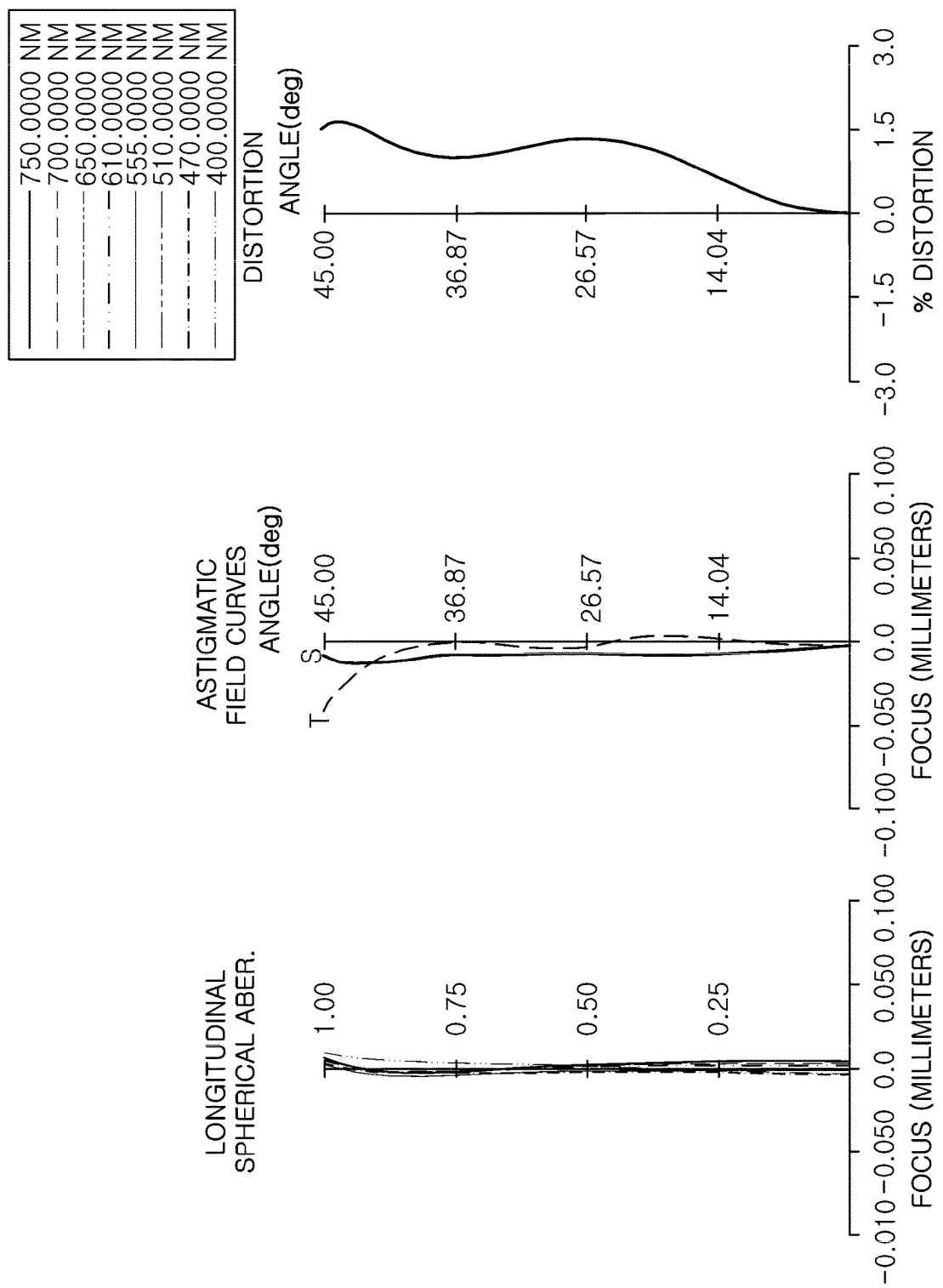
FIGS. 2 and 3 are curves showing aberration characteristics of the optical system shown in FIG. 1.
Figure 3:
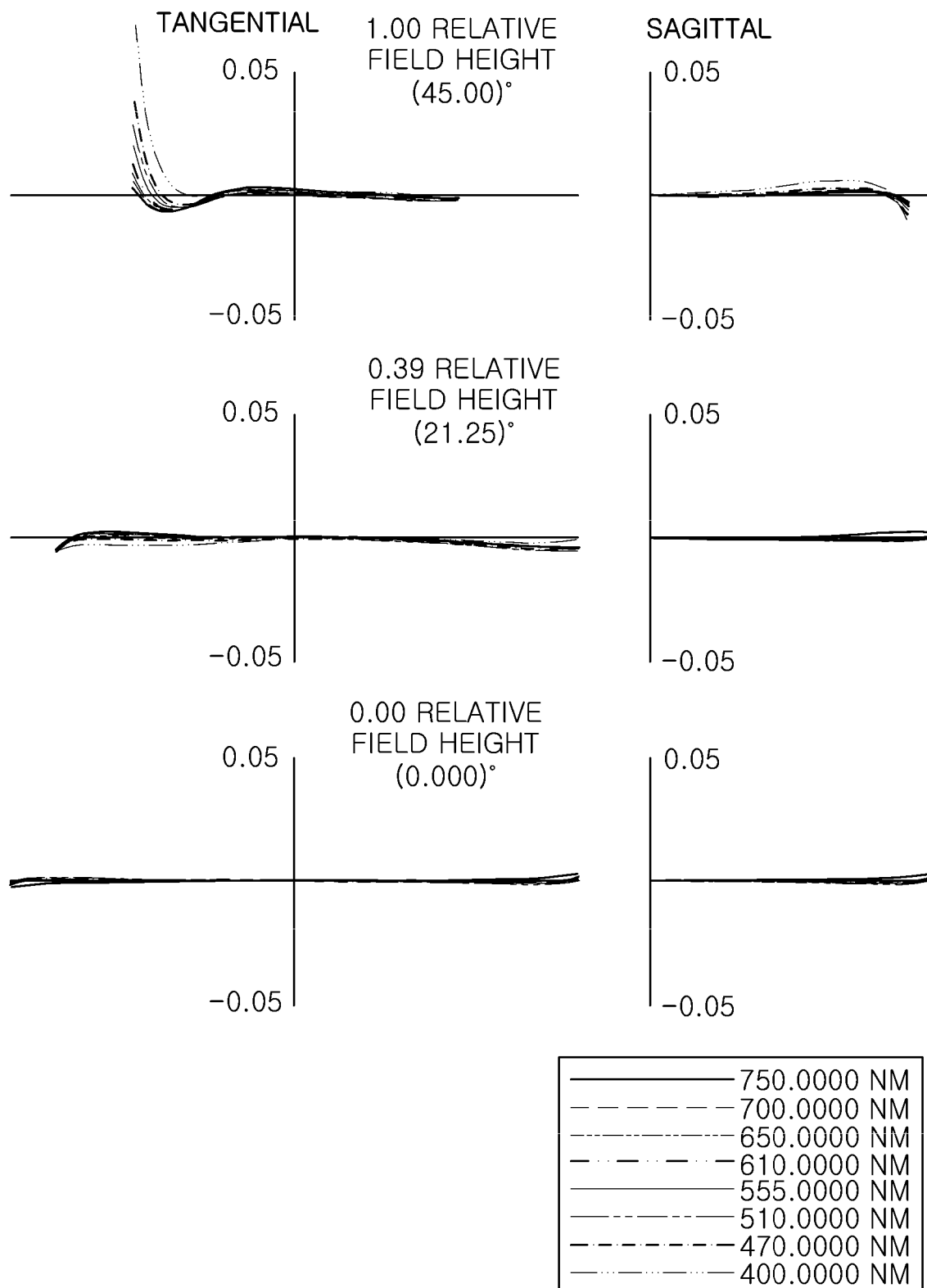
Figure 6:
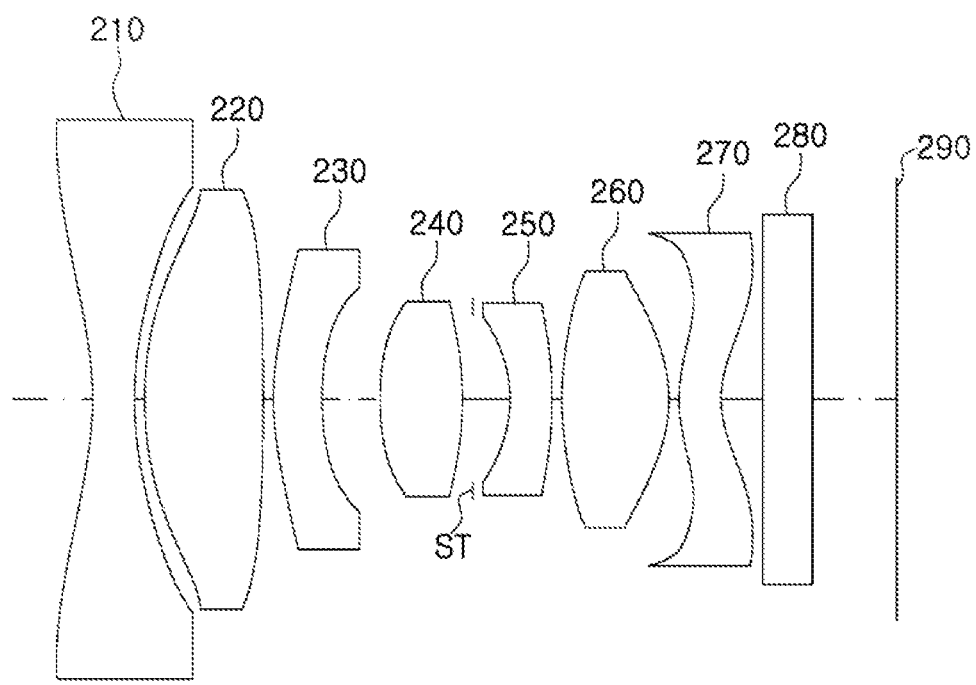
FIG. 6 is a configuration diagram of an optical system according to a second exemplary embodiment of the present disclosure.

In addition, the optical system configured as described above may have aberration characteristics shown in FIGS. 2 and 3.

Meanwhile, it may be appreciated from Table 1 that an optical system according to a first exemplary embodiment of the present disclosure satisfies Conditional Equations 1 to 9 described above. Therefore, optical performance of the lens may be improved.

TABLE 1

| | |
|---|---|
| EFL | 1.31 |
| Fno | 1.6841 |
| ANG | 90.00 |
| EPD | 0.78 |
| TTL | 5.01 |
| SL | 2.40 |
| ImgH | 1.34 |
| ANG/Fno | 53.44 |

An optical system according to a second exemplary embodiment of the present disclosure will be described with reference to FIGS. 6 through 10.

The optical system according to a second exemplary embodiment of the present disclosure may include a first lens 210, a second lens 220, a third lens 230, a fourth lens 240, a fifth lens 250, a sixth lens 260, and a seventh lens 270, and may further include a stop ST, an infrared cut-off filter 280, and an image sensor 290.

Here, lens characteristics (radii of curvature, thicknesses of lenses or distances between the lenses, refractive indices, and Abbe's numbers) of each lens are shown in FIG. 9.

In a second exemplary embodiment of the present disclosure, the first lens 210 may have negative refractive power and have two concave surfaces. The second lens 220 may have positive refractive power and have both surfaces that are convex. The third lens 230 may have positive refractive power and have a meniscus shape in which it is convex toward the object. The fourth lens 240 may have positive refractive power and have both surfaces that are convex. The fifth lens 250 may have negative refractive power and have a meniscus shape in which it is convex toward the image. The sixth lens 260 may have positive refractive power and have both surfaces that are convex. The seventh lens 270 may have negative refractive power and have a meniscus shape in which it is convex toward the object. In addition, the seventh lens 270 may have an inflection point formed on at least one of first and second surfaces thereof.

Meanwhile, the respective surfaces of the first to seventh lenses 210 to 270 may have aspherical surface coefficients as shown in FIG. 10. That is, all of the first surface of the first lens 210 to the second surface of the seventh lens 270 may be aspherical.

In addition, the stop ST may be disposed between the fourth lens 240 and the fifth lens 250.

In addition, the first lens 210 among the first to seventh lenses 210 to 270 may have the largest effective radius, and the second lens 220 among the first to seventh lenses 210 to 270 may have the second largest effective radius.

Figure 7:
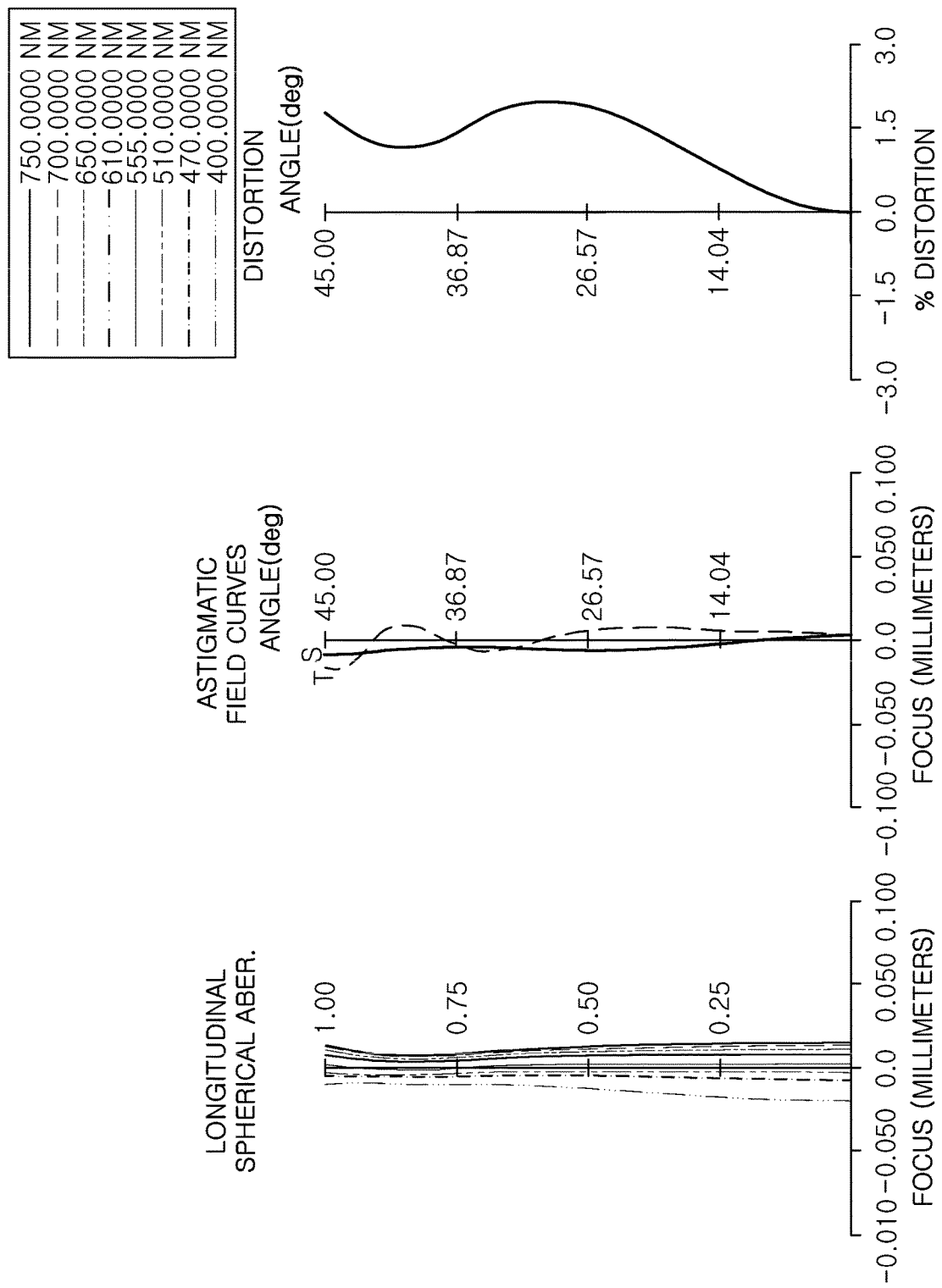
FIGS. 7 and 8 are curves showing aberration characteristics of the optical system shown in FIG. 6.
Figure 8:
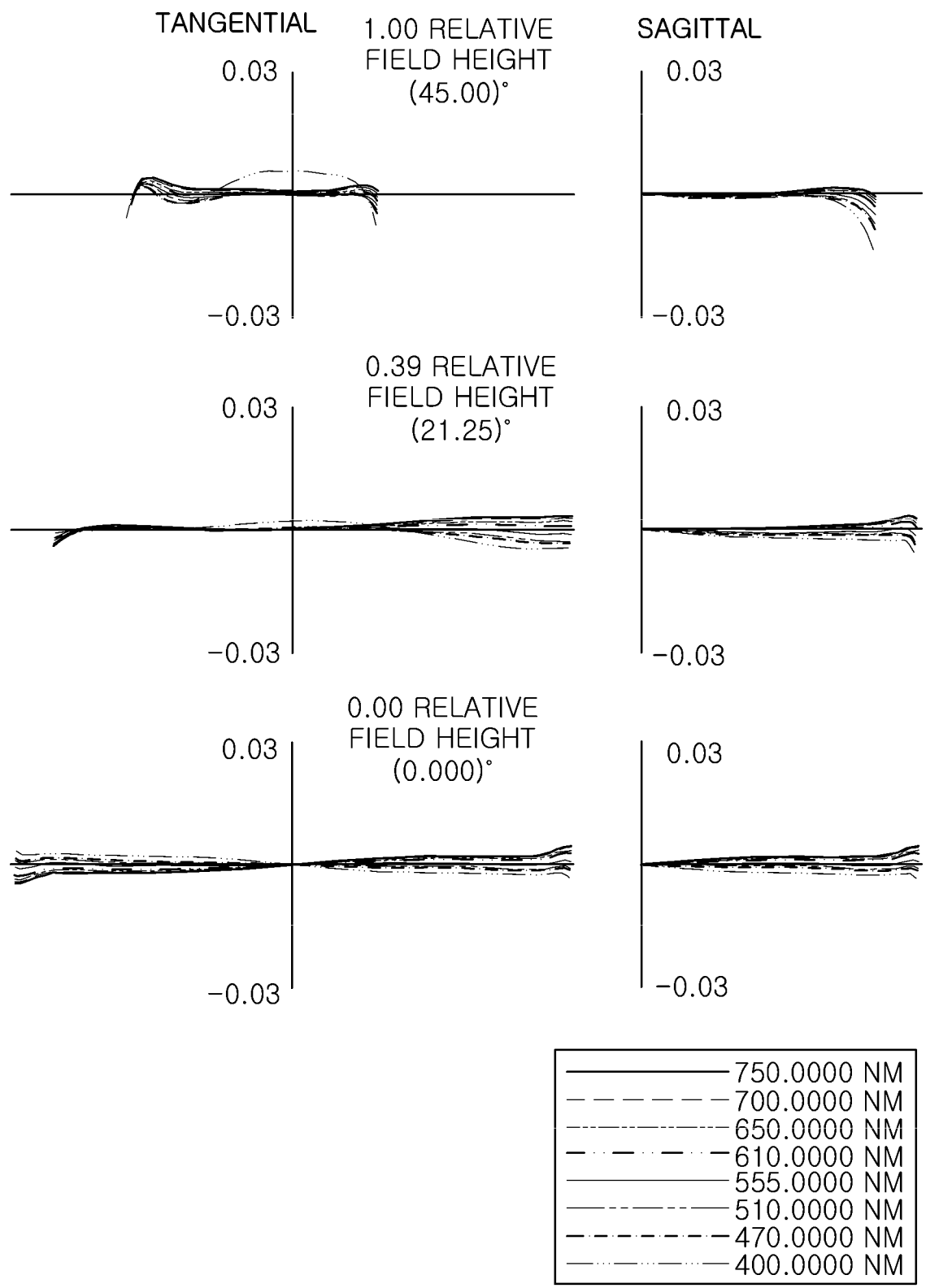

In addition, the optical system configured as described above may have aberration characteristics shown in FIGS. 7 and 8.

Meanwhile, it may be appreciated from Table 2 that an optical system according to a second exemplary embodiment of the present disclosure satisfies Conditional Equations 1 to 9 described above. Therefore, optical performance of the lens may be improved.

TABLE 2

| EFL | 1.29 |
|---|---|
| Fno | 1.5881 |
| ANG | 90.00 |
| EPD | 0.81 |
| TTL | 4.80 |
| SL | 2.53 |
| ImgH | 1.32 |
| ANG/Fno | 56.67 |

An optical system according to a third exemplary embodiment of the present disclosure will be described with reference to FIGS. 11 through 15.

The optical system according to a third exemplary embodiment of the present disclosure may include a first lens 310, a second lens 320, a third lens 330, a fourth lens 340, a fifth lens 350, a sixth lens 360, and a seventh lens 370, and may further include a stop ST, an infrared cut-off filter 380, and an image sensor 390.

Here, lens characteristics (radii of curvature, thicknesses of lenses or distances between the lenses, refractive indices, and Abbe's numbers) of each lens are shown in FIG. 14.

In a third exemplary embodiment of the present disclosure, the first lens 310 may have negative refractive power and have two concave surfaces. The second lens 320 may have positive refractive power and have both surfaces that are convex. The third lens 330 may have positive refractive power and have a meniscus shape in which it is convex toward the object. The fourth lens 340 may have positive refractive power and have both surfaces that are convex. The fifth lens 350 may have negative refractive power and have a meniscus shape in which it is convex toward the image. The sixth lens 360 may have positive refractive power and have both surfaces that are convex. The seventh lens 370 may have negative refractive power and have a meniscus shape in which it is convex toward the object. In addition, the seventh lens 370 may have an inflection point formed on at least one of first and second surfaces thereof.

Meanwhile, the respective surfaces of the first to seventh lenses 310 to 370 may have aspherical surface coefficients as shown in FIG. 15. That is, all of the first surface of the first lens 310 to the second surface of the seventh lens 370 may be aspherical.

In addition, the stop ST may be disposed between the fourth lens 340 and the fifth lens 350.

In addition, the first lens 310 among the first to seventh lenses 310 to 370 may have the largest effective radius, and the second lens 320 among the first to seventh lenses 310 to 370 may have the second largest effective radius.

Figure 11:
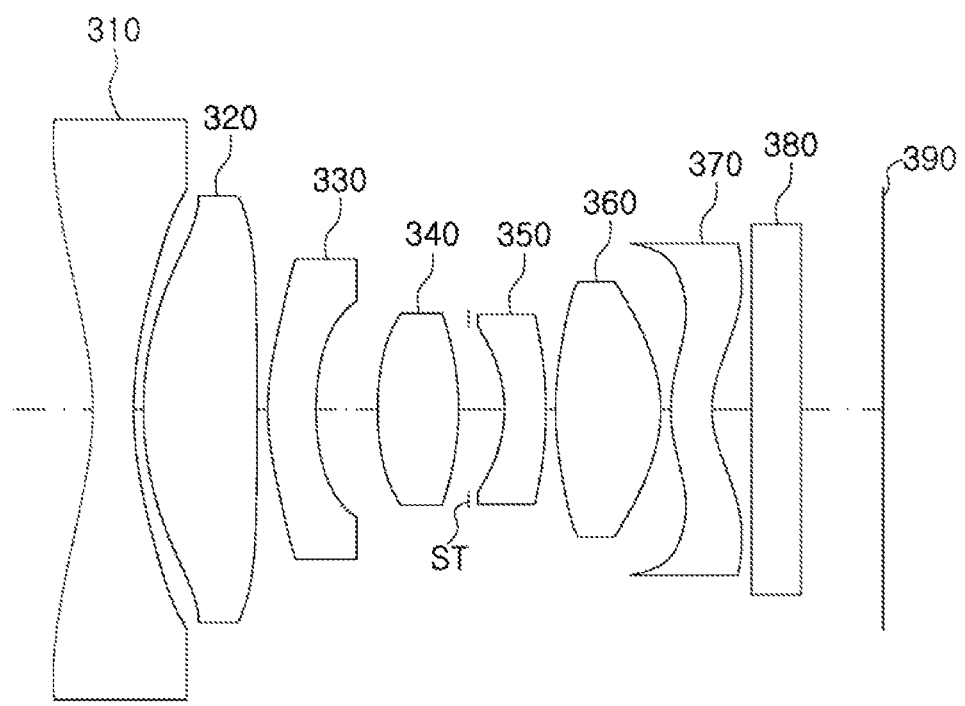
FIG. 11 is a configuration diagram of an optical system according to a third exemplary embodiment of the present disclosure.
Figure 12:
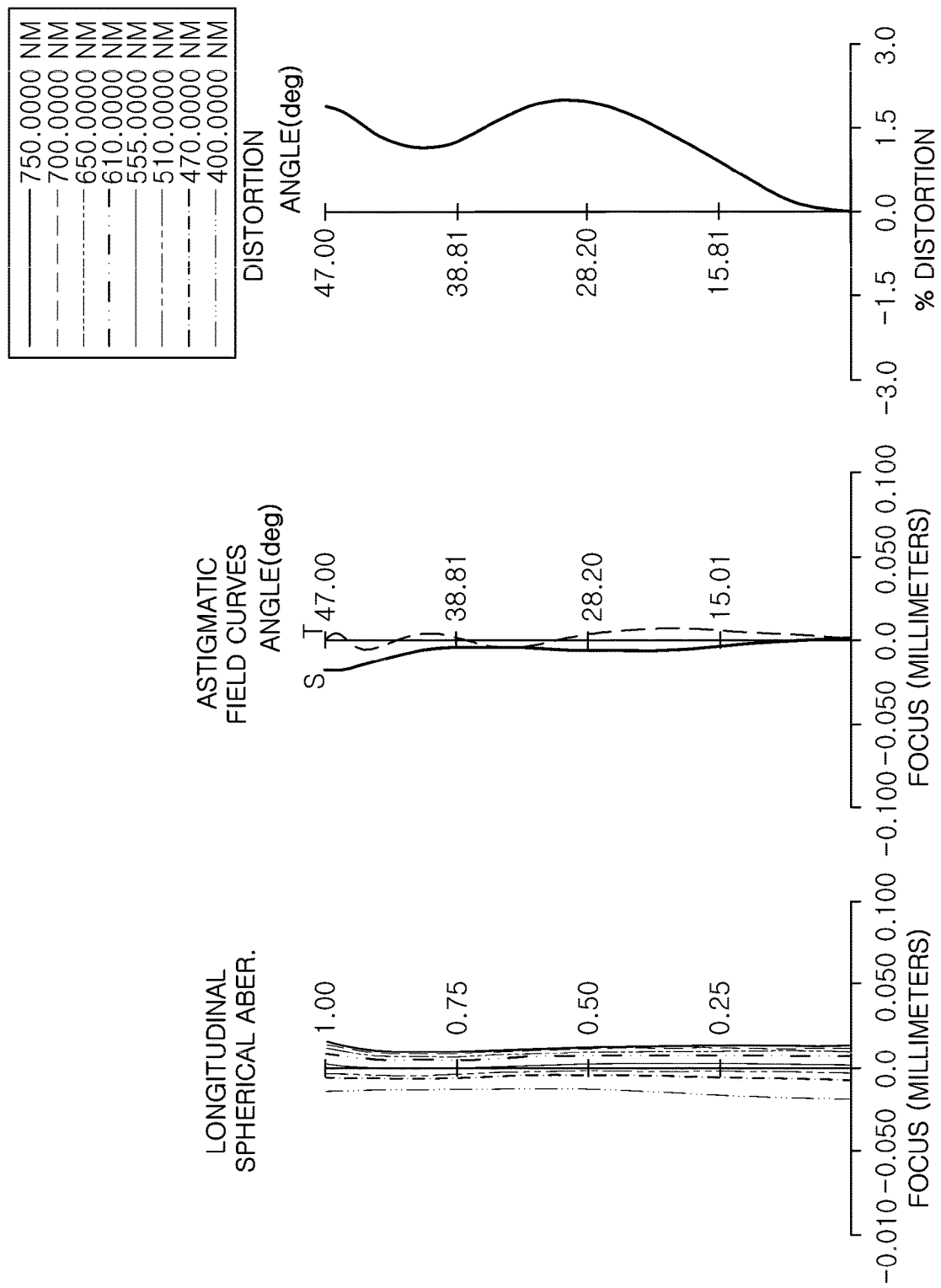
FIGS. 12 and 13 are curves showing aberration characteristics of the optical system shown in FIG. 11.
Figure 13:
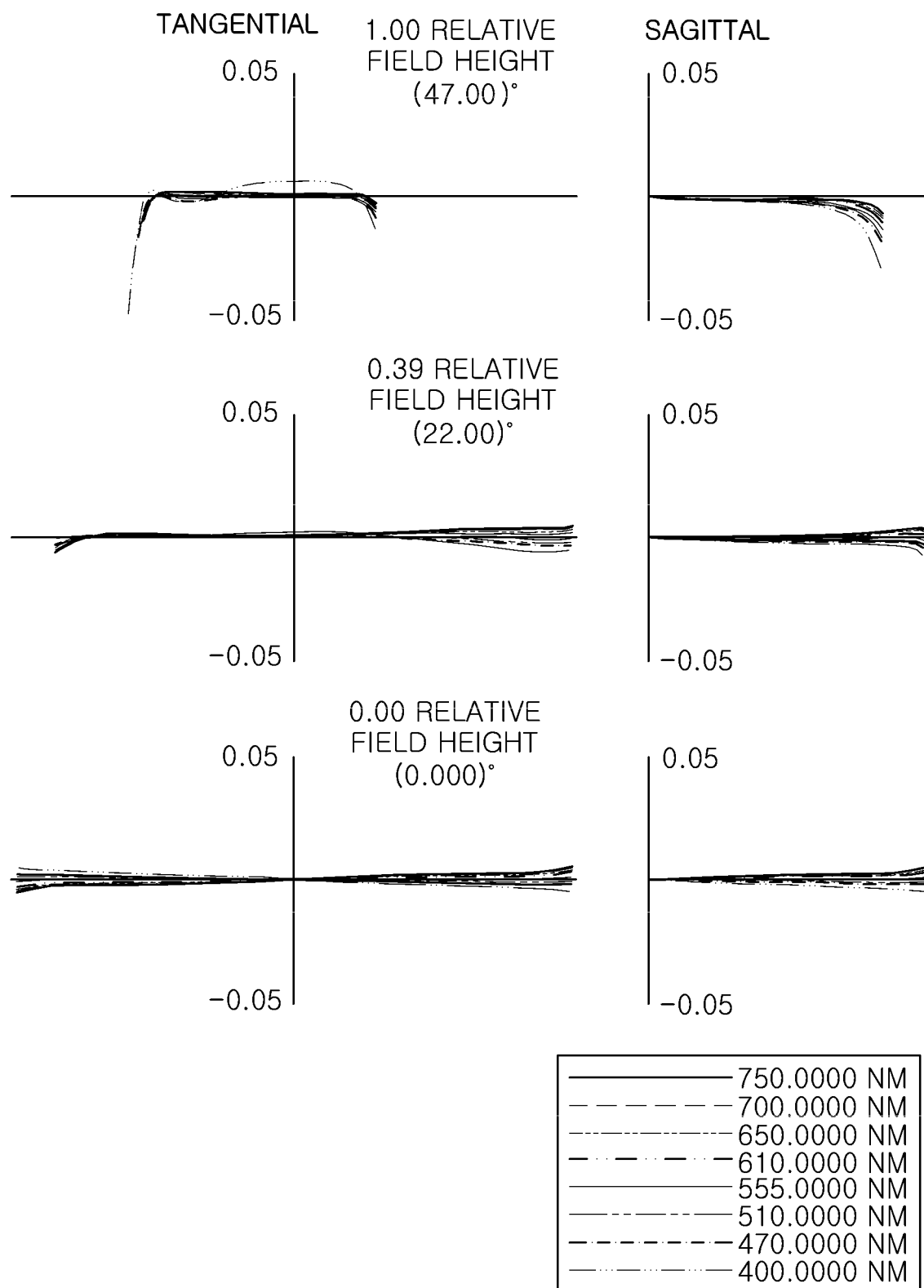

In addition, the optical system configured as described above may have aberration characteristics shown in FIGS. 11 and 12.

Meanwhile, it may be appreciated from Table 3 that an optical system according to a third exemplary embodiment of the present disclosure satisfies Conditional Equations 1 to 9 described above. Therefore, optical performance of the lens may be improved.

TABLE 3

| EFL | 1.23 |
|---|---|
| Fno | 1.5532 |
| ANG | 94.00 |
| EPD | 0.79 |
| TTL | 4.80 |
| SL | 2.52 |
| ImgH | 1.34 |
| ANG/Fno | 60.52 |

As set forth above, with the optical system according to exemplary embodiments of the present disclosure, an aberration improvement effect may be increased, and high resolution and a wide angle may be implemented.

While exemplary embodiments have been shown and described above, it will be apparent to those skilled in the art that modifications and variations could be made without departing from the scope of the present invention as defined by the appended claims.

What is claimed is:

1. An optical system comprising:
   a first lens having negative refractive power and two concave surfaces;
   a second lens having positive refractive power;
   a third lens having refractive power;
   a fourth lens having refractive power;
   a fifth lens having refractive power;
   a sixth lens having refractive power; and
   a seventh lens having refractive power,
   wherein the first to seventh lenses are sequentially disposed from an object side, and
   $53° < ANG/Fno < 61°$ is satisfied, ANG being a field of view of the optical system and Fno being a constant indicating brightness of the optical system.

2. The optical system of claim 1, wherein both surfaces of the fifth lens are concave.

3. The optical system of claim 1, wherein the seventh lens has negative refractive power.

4. The optical system of claim 1, wherein $ANG \geq 90°$ is satisfied.

5. The optical system of claim 1, wherein $Fno \leq 1.7$ is satisfied.

6. The optical system of claim 1, wherein $Fno \leq 1.6$ is satisfied.

7. The optical system of claim 1, further comprising an image sensor configured to convert an image of a subject incident through the first to seventh lenses into an electrical signal; and
   a stop disposed between the fourth and fifth lenses,
   wherein $1.6 < ImgH/EPD < 1.8$ is satisfied, ImgH being one-half of a diagonal length of an imaging surface of the image sensor and EPD being an entrance pupil diameter of the optical system.

8. The optical system of claim 1, further comprising an image sensor configured to convert an image of a subject incident through the first to seventh lenses into an electrical signal, wherein 3.7<TTL/EFL<4.0 is satisfied, TTL being a distance from an object-side surface of the first lens to an imaging surface of the image sensor and EFL being an overall focal length of the optical system.

9. The optical system of claim 1, further comprising an image sensor configured to convert an image of a subject incident through the first to seventh lenses into an electrical signal,
wherein 17°<ANG/TTL<20° is satisfied, ANG being a field of view of the optical system and TTL being a distance from an object-side surface of the first lens to an imaging surface of the image sensor.

10. The optical system of claim 1, further comprising an image sensor configured to convert an image of a subject incident through the first to seventh lenses into an electrical signal,
wherein 3.5<TTL/ImgH<3.8 is satisfied, TTL being a distance from an object-side surface of the first lens to an imaging surface of the image sensor and ImgH being one-half of a diagonal length of the imaging surface of the image sensor.

11. The optical system of claim 1, further comprising an image sensor converting configured to convert an image of a subject incident through the first to seventh lenses into an electrical signal; and
a stop disposed between the fourth and fifth lenses,
wherein 0.4<SL/TTL<0.55 is satisfied, SL being a distance from the stop to an imaging surface of the image sensor and TTL being a distance from an object-side surface of the first lens to the imaging surface of the image sensor.

12. The optical system of claim 1, wherein the seventh lens has an inflection point formed on either one or both of an object-side surface of the seventh lens and an image-side surface of the seventh lens.

13. An optical system comprising:
a first lens having negative refractive power and having two concave surfaces;
a second lens having refractive power;
a third lens having refractive power;
a fourth lens having refractive power;
a fifth lens having refractive power;
a sixth lens having refractive power; and
a seventh lens having refractive power,
wherein the first to seventh lenses are sequentially disposed from an object side,
the second lens has a second largest effective radius among effective radii of the first to seventh lenses, and
53°<ANG/Fno<61° is satisfied, ANG being a field of view of the optical system and Fno being a constant indicating brightness of the optical system.

14. The optical system of claim 13, wherein the fifth lens has negative refractive power and has two concave surfaces.

15. The optical system of claim 13, wherein the seventh lens has positive negative power and a meniscus shape in which an object-side surface of the seventh lens is convex.

16. The optical system of claim 13, wherein ANG≥90° is satisfied.

17. The optical system of claim 13, wherein Fno≤1.7 is satisfied.

18. The optical system of claim 13, wherein Fno≤1.6 is satisfied.

19. The optical system of claim 13, further comprising an image sensor configured to convert an image of a subject incident through the first to seventh lenses into an electrical signal; and
a stop disposed between the fourth and fifth lenses,
wherein 1.6<ImgH/EPD<1.8 is satisfied, ImgH being one-half of a diagonal length of an imaging surface of the image sensor and EPD being an entrance pupil diameter of the optical system.

20. The optical system of claim 13, further comprising an image sensor configured to convert an image of a subject incident through the first to seventh lenses into an electrical signal,
wherein 3.7<TTL/EFL<4.0 is satisfied, TTL being a distance from an object-side surface of the first lens to an imaging surface of the image sensor and EFL being an overall focal length of the optical system.

21. The optical system of claim 13, further comprising an image sensor configured to convert an image of a subject incident through the first to seventh lenses into an electrical signal,
wherein 17°<ANG/TTL<20° is satisfied, ANG being a field of view of the optical system and TTL being a distance from an object-side surface of the first lens to an imaging surface of the image sensor.

22. The optical system of claim 13, further comprising an image sensor configured to convert an image of a subject incident through the first to seventh lenses into an electrical signal,
wherein 3.5<TTL/ImgH<3.8 is satisfied, TTL being a distance from an object-side surface of the first lens to an imaging surface of the image sensor and ImgH being one-half of a diagonal length of the imaging surface of the image sensor.

23. The optical system of claim 13, further comprising an image sensor configured to convert an image of a subject incident through the first to seventh lenses into an electrical signal; and
a stop disposed between the fourth and fifth lenses,
wherein 0.4<SL/TTL<0.55 is satisfied, SL being a distance from the stop to an imaging surface of the image sensor and TTL being a distance from an object-side surface of the first lens to the imaging surface of the image sensor.

24. The optical system of claim 13, wherein the seventh lens has an inflection point formed on either one or both of an object-side surface of the seventh lens and an image-side surface of the seventh lens.

* * * * *